INVENTOR.
Anthony D. Palmentiero

Oct. 17, 1967  A. D. PALMENTIERO  3,348,138
ELECTRICAL WIRING FAULT DETECTOR INCLUDING CIRCUIT MEANS
TO VARY THE BRILLIANCE OF SELECTED LAMP INDICATORS
Filed Aug. 23, 1963  3 Sheets-Sheet 3

INVENTOR.
Anthony D. Palmentiero

# United States Patent Office 3,348,138
Patented Oct. 17, 1967

3,348,138
ELECTRICAL WIRING FAULT DETECTOR
INCLUDING CIRCUIT MEANS TO VARY
THE BRILLIANCE OF SELECTED LAMP
INDICATORS
Anthony D. Palmentiero, 2223 Dogwood Lane,
Westbury, N.Y. 11590
Filed Aug. 23, 1963, Ser. No. 304,193
4 Claims. (Cl. 324—51)

This invention relates generally to the field of circuit continuity testers, and more particularly to electrical indicator devices for testing the electrical integrity of the interconnection wiring of racks of connectors in which are to be inserted "plug-in" modules for the assembly of data processors and other such equipment.

In the manufacture of data processors and the like consisting largely of racks of plug-in modules, the complexity of the layers upon layers of random run interconnection wiring at the rear of the racks creates a staggering problem of detecting, locating, and correcting wiring errors. Many interconnections may be connected between at least two, but more often among a multiplicity of connecting points. To check each wire for open circuits and short circuits by the usual method of "buzzing" is tedious, time consuming, costly, and subject to error.

"Buzzing" is herein defined as the process of connecting a simple series circuit consisting of a power source such as a battery, and an indicator such as a buzzer or lamp across two points and detecting either the existence of electrical continuity or non-continuity between those points.

It is an object of this invention to provide new and improved apparatus for testing a plurality of circuit interconnections.

Another object of this invention is to provide an improved testing apparatus for testing a plurality of circuits for open and short circuit faults.

Another object of this invention is to provide apparatus for identifying automatically each step in the test sequence.

Another object of this invention is to provide an indication which will inform at a glance the quality of the tested circuit at each point of the test sequence.

Another object of this invention is to provide an improved testing apparatus which will automatically step through a test procedure.

Yet another object of this invention is to provide an apparatus for testing complex wiring interconnections which may be easily and accurately used by personnel of relatively low skill.

Figure 1:
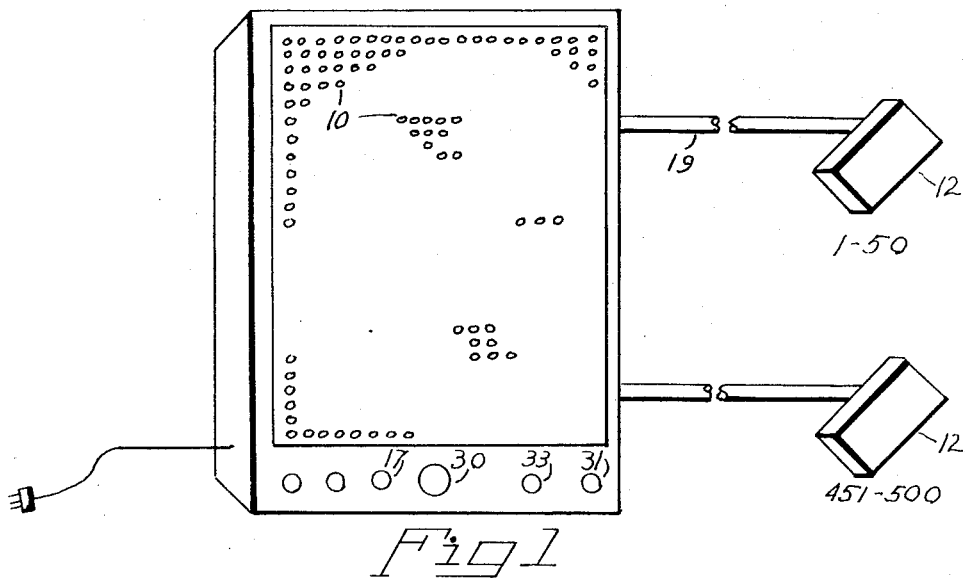
Figure 2:
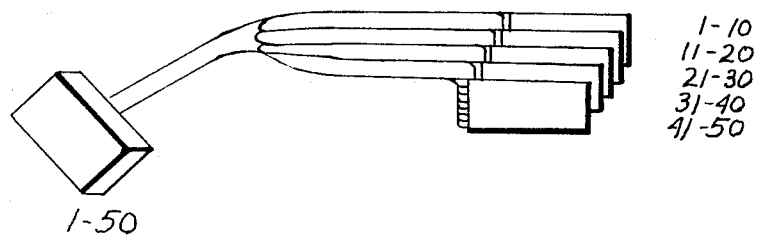
Figure 5:
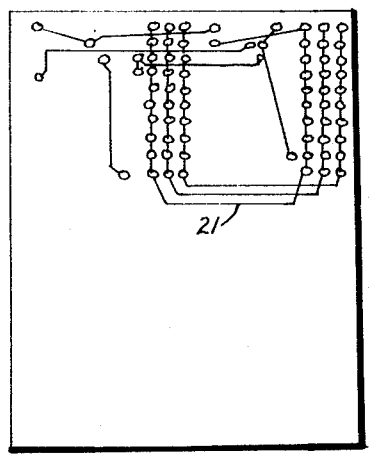
Figure 3:
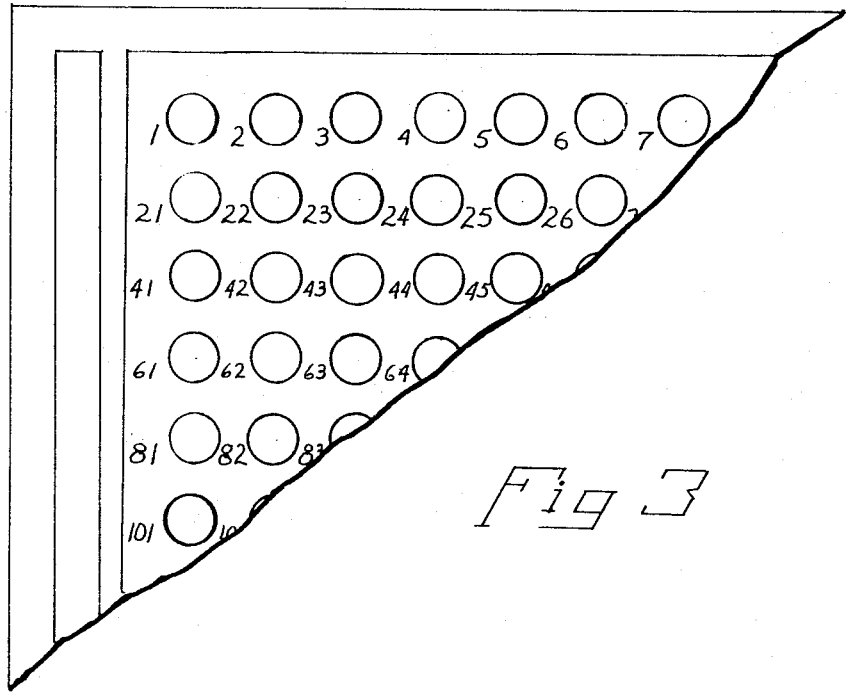
Figure 4:
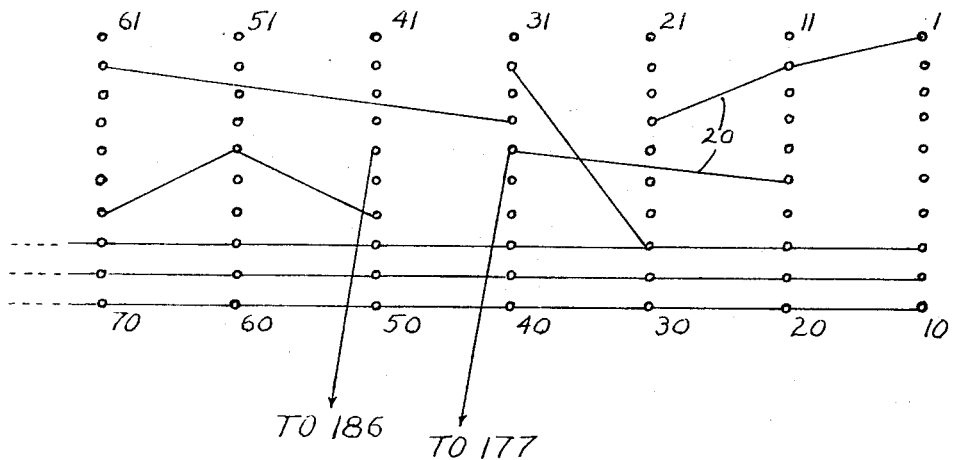
Figure 6:
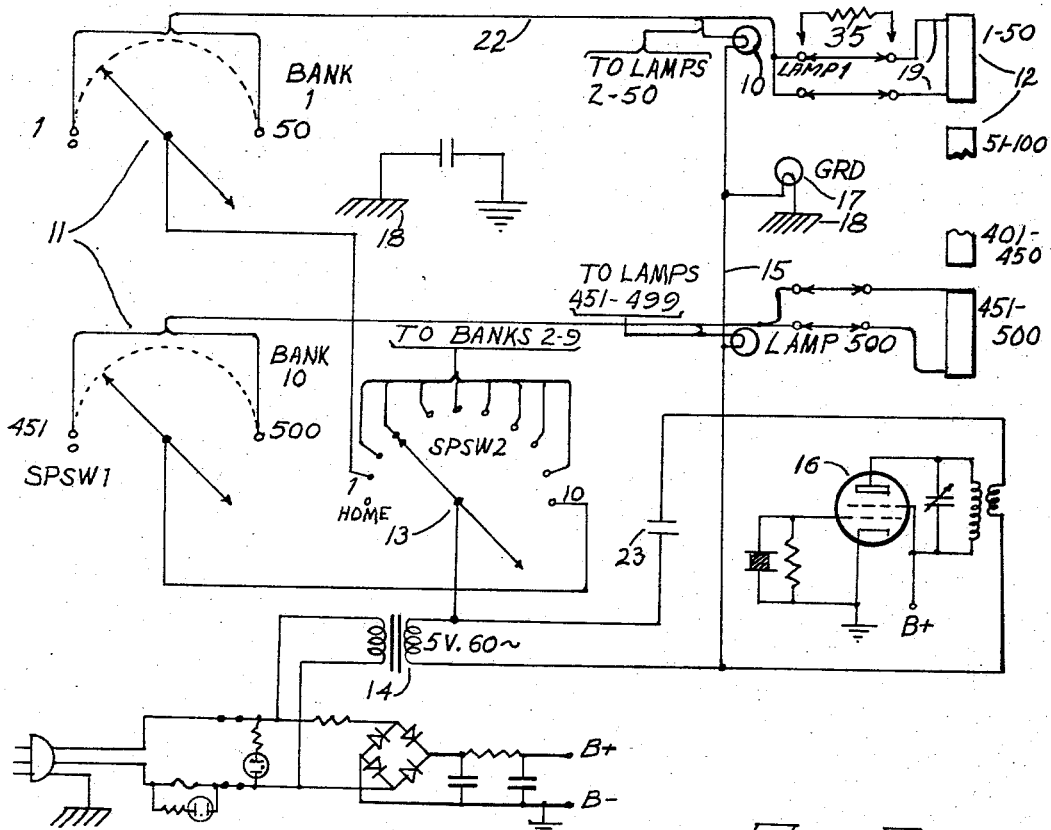
Figure 7:
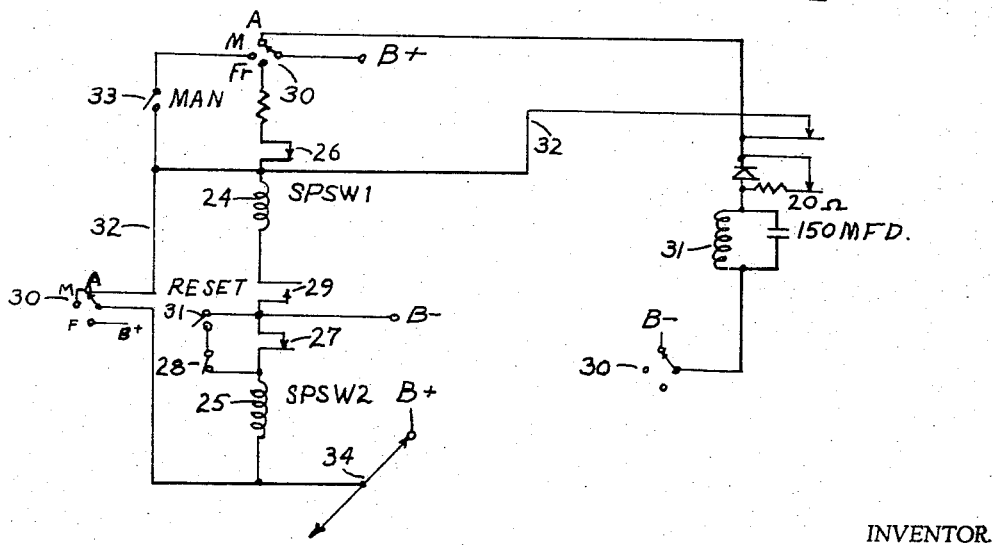

Other objects, aspects, and advantages of this invention will in part be pointed out in, and in part apparent from, the following description considered together with the accompanying drawings, in which:

FIGURE 1 is the front view of a typical test set showing the lamp panel and the cable connectors, FIGURE 2 is a view of a typical connector adapter for joining electrically the test set and a wired rack to be tested, FIGURE 3 is a fragmentary view of the lamp panel, FIGURE 4 is a simplified rear view of a rack to be tested indicating several cross-connection wires, FIGURE 5 is a representation of a transparent overlay intended for placement over the lamp panel of FIGURE 1 and appropriately marked for a test of the cross-connection wiring shown in FIGURE 4, FIGURE 6 is a schematic diagram of the testing portion of the test set described herein, and FIGURE 7 is a schematic diagram of the operating portion of the test set.

Referring to FIGURE 6, each lamp 10 is wired to both a point on one of the banks of stepping switch 1 (SPSW1) 11 and a point on one of the test set connector blocks 12. There is therefore, in this embodiment, 500 lamps mounted in a lamp panel as in FIGURES 1 and 3, 500 points on switch SPSW1 (50 points on each of 10 banks) and 500 connector points, (50 points on each of 10 connector blocks).

A second stepping switch (SPSW2) 13 is provided to select each one of the banks of SPSW1 in sequence.

A step down transformer 14 provides power through stepping switches SPSW2 and SPSW1 in series to illuminate any one of the 500 lamps as determined by the positioning of the aforesaid stepping switches. A common connection 15 to each of the 500 lamps is connected to the power supply return. In a normal testing cycle, the following events will occur; here described first when apparatus to be tested is not connected to the test set.

Stepping switch SPSW2 will rest in "HOME" position and SPSW1 will rest in position 1. On initiation of a test cycle, the control of which is to be described in detail later, SPSW2 advances to position 1, thereby causing lamp number 1 to be illuminated. SPSW1 then commences to advance a step at a time, illuminating lamp numbers 1 through 50 each in turn. After lamp number 50 has been illuminated, the control circuit switches SPSW2 to position 2, connecting thereby the second bank of SPSW1 and illuminating lamp number 51 as SPSW1 commences another revolution. This process continues until all lamps have been illuminated once. For purposes hereinafter described, each illuminated lamp corresponding to the instantaneous position of the two stepping switches shall be called the "HOME" lamp. For example, with SPSW2 at position 5 and with SPSW1 at position 25, lamp number 225 is designated the HOME lamp and will be illuminated.

A test of a data processor rack or the like, an example of which is shown in FIGURE 4 will now be described. Connection of the test set to the rack is accomplished by use of adapters such as is shown in FIGURE 2. By repeating the testing cycle described previously, it will now be apparent that the integrity of the cross connections depicted on the rear of the data processor rack, FIGURE 4, will be tested.

Again, when SPSW1 and SPSW2 are both at their respective rest positions, i.e., position 1 and HOME position respectively, the test cycle will be initiated by advancing SPSW2 to position 1. Lamp number 1, as HOME lamp will again be illuminated, but in addition, because of the cross connections 20 shown in FIGURE 4, lamps number 12 and 24 will also be illuminated. (These same lamps will again illuminate at steps 12 and 24 of SPSW1, but the HOME lamp will in those cases be lamps number 12 and 24 respectively.) At step 2, lamp number 2 alone will be illuminated as there is no cross connection to that terminal.

The illuminated lamps, as it should now be evident, form specific patterns on the lamp panel, FIGURE 1, for each step. An overlay as shown in FIGURE 5, preferably of transparent material, is superimposed on the lamp panel. This overlay is suitably marked with patterns 21 representing the lamps expected to be illuminated at each step so that any lamps not illuminated that should be, or lamps wrongly illuminated can be easily detected. The markings preferably should be of different colors for each pattern in order to permit easy recognition of adjacent or touching patterns. The patterns shown in FIGURE 5 in combination with FIGURE 3 are suitable for testing the interconnection wiring depicted in FIGURE 4.

If a data processor rack is of such complexity that one overlay is insufficient to fully test it, additional overlays may be superimposed over the first, with new patterns marked thereon, with opaque patterns obscuring the markings of the previous overlays.

In order to test for short circuits to chassis within the data processor rack, an extra lamp 17 is provided. Whenever a cross connection wire is grounded to the metallic framework, power applied to the wire, in its turn, will energize the framework through the fault, said framework depicted on FIGURE 6 by a special ground symbol 18, and cause ground lamp 17 to be illuminated.

During a test procedure, particularly when many lamps are illuminated simultaneously, it is useful to determine at which step of the test procedure the test set is positioned, or more specifically, which of the lamps is the "home" lamp. With this information, an interrupted test may be resumed at the point it stopped, the location of a fault may be noted by recording the number of the home lamp, and a sense of sequence and order is imparted to the operator, thereby enhancing his interest and reducing the possibility of error. By arranging the apparatus so that the HOME LAMP is of a different brilliance than the others, this desirable information can be secured. Referring to FIGURE 6, this novel feature is effected in my embodiment by arranging for a greater impedance to exist in conductors 19 leading to the connectors 12 from the lamps, than in conductors 22 leading to the points of stepping switch SPSW1 from the lamps. This may be accomplished by introducing appropriately valued impedances 35 in series with conductors 19. A preferable and much simpler method is to superimpose a high frequency power supply 16 on the aforementioned low frequency power supply 14. Capacitor 23 blocks the low frequency current from passing through the high frequency power supply while permitting high frequency current to pass. The reverse effect of the step-down transformer blocks the high frequency current while passing low frequency current. If the low frequency supply is direct current (zero cycles per second) a series choke may be required to impede the flow of high frequency current through the low frequency supply. Inasmuch as conductors 22 are relatively short leads within the test set, and conductors 19 direct the combination of high and low frequency current through a comparatively circuitous route through the data processor rack, though the relative resistances of the two paths are negligibly different, their relative inductance at the high frequency selected assumes significant values. An impedance difference is presented to the high frequency component of the power supply current which is sufficient to cause the HOME lamp to brighten visibly above the brightness of the lamps illuminated secondarily through the cross-connections of the data processor rack. In the embodiment herein described, a high frequency in the order of 8 megacycles has been found to be satisfactory.

*Operating control*

Referring to FIGURE 7, the operating control circuit is shown consisting in part of the drive solenoids for stepping switches SPSW1 24 and SPSW2 25. It is to be understood that the application of B plus and B minus simultaneously to the terminals of either solenoid will cause the solenoid to pull in an armature coupled through a ratchet to the sliding contacts of each stepping switch, against a heavy spring. Removal of either B plus or B minus will result in the spring restoring the armature to its rest position and causing the stepping switch sliding contacts to advance one step.

A pair of contacts called INTERRUPTER SPSW1 26 is connected to the aforesaid armature of SPSW1 so that as the armature is pulled in by the application of B plus and B minus to the solenoid of SPSW1, the contacts of said INTERRUPTER switch are opened. Otherwise, the contacts are closed.

Another pair of contacts called HOME SW–SPSW1 27 is mounted on SPSW1 in such a manner that a cam attached to the shaft of the sliding contacts will cause the HOME-SW contacts to close at only one step position of SPSW1, specifically at HOME position. The HOME SW is open when SPSW1 is stepped from HOME position through each of positions 1 through 50.

Stepping switch SPSW2 is equipped with two HOME switches 28 and 29 called respectively HOME SW(1) SPSW2 and HOME SW(2) SPSW2. The first is normally open, but is closed at HOME position. The second is normally closed, but is open at HOME position. Stepping switch SPSW2 is arranged to switch from positions 1 through 10 in addition to HOME position.

It is to be understood that the stepping switches described herein are generally well known in the art and are only one particular type and form of which may be used successfully in the application of the inventions disclosed in this embodiment.

*Automatic mode*

During a normal test procedure, the test set is intended to advance automatically from step to step at a period of approximately one or two seconds per step, while the operator views the lamp panel for proper distribution of the illuminated lamps. This is accomplished first by switching the mode switch 30 to "A." A pulse of the proper repetition rate is then caused to be generated by a slow operate-slow release relay 31 in combination with appropriate circuitry well known in the art. Proper selection of the components will produce any desired rate of operation. Pulses of B plus are thereby introduced into line 32.

At rest position, before commencement of a test cycle, stepping switch SPSW1 rests in position 1 and SPSW2 rests in HOME position. As SPSW1 is at position 1, HOME SW SPSW1 27 is open. As SPSW2 is at HOME position, its HOME SW(1) 28 is closed, and HOME SW(2) 29 is open. B minus is therefore disconnected from both SPSW1 and SPSW2 and the pulsating B plus applied to both solenoids through line 32 is ineffective.

To commence the test cycle, the operator will press the RESET switch 31 momentarily, thereby connecting B minus to the SPSW2 solenoid 25. The next pulse of B plus will cause SPSW2 to step to position 1, opening its HOME SW(1) 28 and closing its HOME SW(2) 29. The RESET switch 31 is now ineffectual. The test is now commenced with HOME lamp number 1 (FIGURE 6) illuminated, and also any other lamps connected through the cross connections of the data processor rack.

As HOME SW(2) SPSW2 29 is now closed, B minus is also connected to the solenoid of SPSW1. Each B plus pulse now causes SPSW1 to advance from step to step at the prescribed rate.

As SPSW1 steps from position 50 to HOME position to begin a new revolution, HOME SW SPSW1 27 is closed, permitting both SPSW1 and SPSW2 to advance and step simultaneously at the next B plus pulse; SPSW1 to connection 51 (position 1 of the second bank) while SPSW2 steps to position 2.

At the end of the test cycle, when SPSW1 is in HOME position after stepping from connection 500 (position 50 of the tenth bank) both SPSW1 and SPSW2 step simultaneously; SPSW1 to position 1, and SPSW2 to HOME position, whereby operation ceases as B minus is again disconnected from both solenoids.

*Manual mode*

Referring to FIGURE 7, the mode switch 30 is operated to "M". The pulse generating relay 31 is disconnected and manual switch 33 now applies B plus pulses, manually controlled, to line 32. Operation is otherwise identical to the automatic mode herein before explained. Again, stepping switch SPSW2 must be stepped from HOME position to position 1 by operating the RESET switch 31. However, because the B plus pulses are not now present, and to obviate the necessity of operating the manual switch 33 simultaneously with the RESET switch, B plus is picked up on an extra bank HOME position 34 of SPSW2 for this purpose only.

*Free running mode*

It is often useful and desirable to recheck at will any position of the test cycle without having to wait for the stepping switches to proceed at their normal rate before arriving at the desired location. The control circuit, in the free running mode can be made to "buzz" through the test cycle at an extremely rapid rate to the desired point. By switching the mode switch 30 to Fr, line 32 is pulsed with B plus at a rate determined only by the mass of the armature of SPSW1 and the spring tension returning the armature, by the "buzzer" action of the INTERRUPTER SPSW1 26. B plus is applied directly to the solenoid of SPSW2 to ensure proper operation, but otherwise the sequence of operations is identical to that of the AUTOMATIC mode. As the moving light of the HOME lamp appears to traverse sequentially across the lamp panel, the operator can, at the proper time, switch to MANUAL mode, stopping the rapid advancement of the selector switches, and then advance manually to the desired point. As in the other modes, the RESET switch is required to initiate the operation, and the operation will automatically cease when SPSW2 arrives at its HOME position.

While a specific embodiment has been shown and described, it will of course, be understood that various modifications may be made without departing from the invention. The appended claims are therefore intended to cover any such modifications within the true spirit and scope of this invention.

What is claimed is:

1. Wiring testing apparatus for testing the rear interconnection wiring between an array of plug-in receptacles each having a plurality of electrically conducting points, each point so disposed as to appear at both the rear and front of said receptacles comprising, connector means for insertion in mating relationship with the plug-in receptacles and having a plurality of electrically conducting points corresponding to the plurality of points in said plug-in receptacles and so arranged that when in said relationship, each point of the connector means is in electrical contact with the front of each corresponding point of the plug-in receptacles, an array of power sensitive lamps of a type capable of varying in brilliance in proportion to the power dissipated therein and having a first lead of each lamp electrically connected to a corresponding one of the plurality of said points in said connector means and a second lead of each lamp connected to a lamp common point, selector switch banks having a plurality of points each of which is electrically connected to a corresponding one of the plurality of points in said connector means together with said first lamp leads, forming thereby two parallel electrical paths, the first a local complete short path from each point of the selector switch banks through the one lamp connected thereto, and the second a conditionally complete and more extensive long path from the same point of the selector switch banks through the connection to a corresponding point in said connector means, a further conditional electrical path of at least one conductor between points of the plug-in receptacle comprising the tested wiring connected thereto, at least one of the connections between the connector means and the selector switch banks corresponding to the tested wiring connection assignments and thence through at least one other corresponding lamp connected thereto, a selector switch armature means including armature drive means so arranged as to sequentially connect electrically to each one of said plurality of points on said selector switch banks, a power supply connected between said selector switch armature and said lamp common point, said power supply providing two voltage components superimposed on its output, the first being of a frequency low enough to cause the relative reactive impedances presented to it by the shortest path as compared to any other path to be negligible, and the second being of a frequency high enough to cause the relative impedances presented to it by the shortest path as compared to any other path to be significantly different such that any lamp illuminated by the combination of the two voltage components through the shortest path would be visibly brighter than other lamps illuminated through the longer paths, a light transmitting panel having a plurality of groups of markings thereon, each group separately distinguishable from the other groups and so positioned as to be proximately in front of the lamp panel with each said group in turn coincident with a corresponding pattern of properly illuminated lamps.

2. A wiring tester for testing the interconnection wiring of points on plug-in receptacles comprising, connector means having a plurality of points to be electrically mated and connected to corresponding points on said plug-in receptacles, at least one selector switch bank having a plurality of points, each of which is electrically connected through an impedance means to a corresponding one of the plurality of points in said connector means, each said impedance means having a value which when interposed in an electrical circuit, would cause a perceptible dimming of a power sensitive lamp, an array of power sensitive lamps of a type capable of varying in brilliance in proportion to the power dissipated therein, and having a first lead of each lamp electrically connected to a corresponding one of the plurality of points on said selector switch banks to which said impedances are connected, and the second lead of each lamp connected to a lamp common point, a selector switch armature including armature drive means so arranged as to sequentially connect electrically to each one of said plurality of points on said selector switch banks, and a power supply connected between said selector switch armature and said lamp common point for illuminating said lamps thus forming a plurality of primary circuits each consisting of said lamp connected between each selector switch point and the lamp common point and a plurality of secondary circuits each connected in parallel with said each primary circuit and consisting of at least one of said impedance means connected between each said selector switch point and a corresponding point of said connector means, at least one conditionally present circuit loop to be tested between a corresponding point of the plug-in receptacles and at least one other point on said plug-in receptacles, at least one return connection between a corresponding point on the connector means through at least another one of said impedance means to a corresponding point on said selector switch banks and thence through at least one other lamp to the lamp common point.

3. A wiring tester for testing the interconnection wiring of points on plug-in receptacles comprising, connector means having a plurality of points to be electrically mated and connected to corresponding points on the plug-in receptacles, selector switch banks having a plurality of points, each of which is electrically connected to a corresponding one of the plurality of points in said connector means, an array of power sensitive lamps of a type capable of varying in brilliance in proportion to the power dissipated therein and having a first lead of each lamp electrically connected to a lamp common point and a second lead of each lamp electrically connected to a corresponding one of the plurality of points in said selector switch banks together with said electrical connection between said selector switch banks and said connector means, each lamp second lead forming a primary path that is of shorter length than any secondary electrical path forming a complete circuit to any other lamp, said secondary electrical path forming a parallel path to the primary path and consisting of said electrical connection between any one of the plurality of points on the selector switch banks and the corresponding one of the plurality of points on the connector means, an electrical connection from said corresponding one of the plurality of points on the connector means to at least one second point of the plurality of points on the connector means, and at least one second electrical connection back from the second point of the plurality of points on the connector means to at least one second point on the selector switch banks and to the lamp second leads connected thereon, forming thereby a complete secondary electrical circuit, at least one selector switch armature including drive means so arranged as to sequentially connect electrically to each one of said plurality of points on said selector switch banks, a power supply sequentially connected between each said selector switch armature and said lamp common point, said power supply providing two voltage components superimposed on its output, the first being of a frequency low enough to cause the relative reactive impedances presented to it by the shortest primary path as compared to any other secondary path to be negligible and the second being of a frequency high enough to cause the relative reactive impedances presented to it by the shortest path as compared to any other path to be significant, such that any lamp illuminated by the combination of the two voltage components through the shortest path would be visibly brighter than other lamps illuminated through the longer paths.

4. The apparatus described in claim 3 having said array of lamps forming a panel to display patterns of illuminated lamps signifying the quality of the interconnection wiring of the plug-in receptacles, and additionally comprising an overlay of a light transmitting panel with markings thereon to identify the correct light pattern of a test step.

References Cited
UNITED STATES PATENTS

| | | | |
|---|---|---|---|
| 1,172,360 | 2/1916 | Hildburgh | 40—28 |
| 1,484,795 | 2/1924 | Munsell | 35—28.3 X |
| 2,823,304 | 2/1958 | Shiels. | |
| 2,869,076 | 1/1959 | Evans et al. | 324—51 |
| 2,932,791 | 4/1960 | Carrington | 324—54 X |
| 2,953,744 | 9/1960 | Miller et al. | 324—66 |
| 2,961,607 | 11/1960 | Hunt | 324—73 |
| 2,977,530 | 3/1961 | Cook | 324—51 |
| 3,182,253 | 5/1965 | Dorsch et al. | 324—51 |
| 3,197,695 | 7/1965 | Wingfield | 324—51 |

OTHER REFERENCES

French, W. K., IBM Technical Disclosure Bulletin, vol. 2, No. 6, April 1960, pp. 5 and 6.

RUDOLPH V. ROLINEC, *Primary Examiner.*

WALTER L. CARLSON, *Examiner.*

G. R. STRECKER, *Assistant Examiner.*